(12) United States Patent
Gaither et al.

(10) Patent No.: US 6,405,322 B1
(45) Date of Patent: Jun. 11, 2002

(54) SYSTEM AND METHOD FOR RECOVERY FROM ADDRESS ERRORS

(75) Inventors: Blaine D. Gaither; John A. Morrison, both of Ft. Collins; John R. Feehrer, Loveland, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/290,942

(22) Filed: Apr. 13, 1999

(51) Int. Cl.⁷ .............................................. G06F 12/16
(52) U.S. Cl. .......................... 714/5; 714/768; 714/805; 714/763; 711/144; 711/146
(58) Field of Search .......................... 714/53, 763, 768; 714/805; 711/144, 146

(56) References Cited

U.S. PATENT DOCUMENTS

| | | | | |
|---|---|---|---|---|
| 4,833,601 A | * | 5/1989 | Barlow et al. | 364/200 |
| 5,173,905 A | * | 12/1992 | Parkinson et al. | 370/40.1 |
| 5,369,753 A | | 11/1994 | Tipley | 395/425 |
| 5,406,504 A | * | 4/1995 | Denisco et al. | 364/580 |
| 5,455,834 A | * | 10/1995 | Chang et al. | 371/40.1 |
| 5,515,381 A | * | 5/1996 | Chan | 371/37.7 |
| 5,623,632 A | | 4/1997 | Liu et al. | 395/471 |
| 5,629,950 A | * | 5/1997 | Godiwala et al. | 371/51.1 |
| 5,809,524 A | * | 9/1998 | Singh et al. | 711/118 |
| 5,862,316 A | * | 1/1999 | Hagersten et al. | 395/182.13 |
| 5,875,201 A | * | 2/1999 | Bauman et al. | 371/49.1 |
| 5,963,718 A | * | 10/1999 | Muramatsu | 395/185.07 |

OTHER PUBLICATIONS

Allen, et al., "A high performance bus and cache controller for PowerPC multiprocessing systems," Computer Design: VLSI in Computers and Processors, 1995. ICCD '95.Proceedings., 1995 IEEE International Conference on , 1995, pp. 204–211.*

Patterson and Hennessy, Computer Architecture A Quantitative Approach, Second Edition, 1990: Chapters 1.7 and 1.8, pp. 39–44; Chapters 5.1 and 5.2, pp. 373–390; Chapter 6.6, pp. 525–527; Chapters 8.3 and 8.4, pp. 654–693; Chapters E.1 and E.2.

Thorson, "Multiprocessor Cache Coherency—MOESI Model Describes Snooping Protocols", Microprocessor Report, Jun. 20, 1990, pp. 12–15.

Sweazey, "Shared Memory Systems on the Futurebus", National Semiconductor Corporation, CH2539–5/88/0000/ 0505, 1998 IEEE, pp. 505–511.

Sweazey, "VLSI Support for Copyback Caching Protocols on Futurebus", IEEE, CH2643–5/88/0000/0240, 1988, pp. 240–246.

Sweazey and Smith, "A Class of Compatible Cache Consistency Protocols and Their Support by the IEEE Futurebus", IEEE, 0884–7495/86/0000/0414, 1986, pp. 414–423.

* cited by examiner

*Primary Examiner*—Robert Beausoleil
*Assistant Examiner*—Michael Maskulinski (57) ABSTRACT

A device and method for recovery from address errors is described. When an address error is detected on a local channel, such as a local bus, the coherency states of one or more lines of cache memory associated with the local channel are read, and actions are taken in response. Reading of coherency states ranges from a complete and active interrogation of all cache lines, to a selective and passive interrogation, such as in responding to snoop requests. If the data state consistency is unknown, such as when the MESI state is Modified (M) or Exclusive (E), then the corresponding data in main memory is poisoned. Poisoning may be accomplished by writing a detectable but unrecoverable error pattern in the main memory. Alternatively, the same effect may be accomplished by signaling a hard error on the system bus. If the data state consistency of an interrogated cache line is Shared (S) or Invalid (I), the line may be ignored or the line marked invalid. If the state of the cached line is valid and consistent, such as the "Modified uncached" (Mu) state in a MuMESI protocol, then the line may be written to main memory or provided to a snoop requester.

18 Claims, 5 Drawing Sheets

SYSTEM AND METHOD FOR RECOVERY FROM ADDRESS ERRORS

TECHNICAL FIELD

The invention relates to computers and processor systems. More particularly, the invention relates to recovery from address channel errors in a multiprocessor computing system having cache memory.

BACKGROUND ART

In a computer system, the interface between a processor and memory is critically important to the performance of the system. Because fast memory is very expensive, memory in the amount needed to support a processor is generally much slower than the processor. In order to bridge the gap between fast processor cycle times and slow memory access times, cache memory was developed. A cache is a small amount of very fast, zero wait state memory that is used to store a copy of frequently accessed data and instructions from main memory. The microprocessor can operate out of this very fast memory and thereby reduce the number of wait states that must be interposed during memory accesses. When the processor requests data from memory and the data resides in the cache, then a cache read "hit" takes place, and the data from the memory access can be returned to the processor from the cache without incurring wait states. If the data is not in the cache, then a cache read "miss" takes place, and the memory request is forwarded to the system and the data is retrieved from main memory, as would normally be done if the cache did not exist. On a cache miss, the data that is retrieved from the main memory is provided to the processor and is also written into the cache due to the statistical likelihood that this data will be requested again by the processor.

The individual data elements stored in a cache memory are referred to as "lines." Each line of a cache is meant to correspond to one addressable unit of data in the main memory. A cache line thus comprises data and is associated with a main memory address in some way. Schemes for associating a main memory address with a line of cache data include direct mapping, full association and set association, all of which are well known in the art.

The presence of caches should be transparent to the overall system, and various protocols are implemented to achieve such transparency, including write-through and write-back protocols. In a write-through action, data to be stored is written to a cache line and to the main memory at the same time. In a write-back action, data to be stored is written to the cache and only written to the main memory later when the line in the cache needs to be displaced for a more recent line of data or when another processor requires the cached line. Because lines may be written to a cache exclusively in a write-back protocol, precautions must be taken to manage the status of data in a write-back cache, as described in greater detail below.

Cache management is generally performed by a device referred to as a cache controller. A principal cache management objective is the preservation of cache coherency. In computer systems where independent bus masters can access memory, there is a possibility that a bus master, such as another processor, network interface, disk interface, or video graphics card might alter the contents of a main memory location that is duplicated in the cache. When this occurs, the cache is said to hold stale or invalid data. In order to maintain cache coherency, it is necessary for the cache controller to monitor the system bus when the processor does not own the system bus to see if another bus master accesses main memory. This method of monitoring the bus is referred to as "snooping."

The cache controller must monitor the system bus during memory reads by a bus master in a write-back cache design because of the possibility that a previous processor write may have altered a copy of data in the cache that has not been updated in main memory. This is referred to as read snooping. On a "read snoop hit," where the cache contains data not yet updated in main memory, the cache controller generally provides the respective data to main memory, and the requesting bus master generally reads this data en route from the cache controller to main memory, this operation being referred to as "snarfing." The cache controller must also monitor the system bus during memory writes because another bus master may write to or alter a memory location that resides in the cache. This is referred to as write snooping. On a "write snoop hit," the cache entry is either marked invalid in the cache directory by the cache controller, signifying that this entry is no longer correct, or the cache is updated along with main memory. Therefore, when another bus master reads or writes to main memory in a write-back cache design, or writes to main memory in a write-through cache design, the cache controller must latch the system address and perform a cache look-up to see if the main memory location being accessed also resides in the cache. If a copy of the data from this location does reside in the cache, then the cache controller takes the appropriate action depending on whether a read or write snoop hit has occurred. This prevents incoherent data from being stored in main memory and the cache, thereby preserving cache coherency.

Another consideration in the preservation of cache coherency is the handling of processor writes to memory. When the processor writes to main memory, the memory location must be checked to determine if a copy of the data from this location also resides in the cache. If a processor write hit occurs in a write-back cache design, then the cache location is updated with the new data and main memory may be updated with the new data at a later time or should the need arise. In a write-through cache, the main memory location is generally updated in conjunction with the cache location on a processor write hit. If a processor write miss occurs, the cache controller may ignore the write miss in a write-through cache design because the cache is unaffected in this design. Alternatively, the cache controller may perform a "write-allocate" whereby the cache controller allocates a new line in a cache in addition to passing the data to the main memory. In a write-back cache design, the cache controller generally allocates a new line in the cache when a processor write miss occurs. This generally involves reading the remaining entries to fill the line from main memory before or jointly with providing the write data to the cache. Main memory is updated at a later time should the need arise.

Caches may be designed independently of the microprocessor, in which case the cache is placed on the local bus of the microprocessor and interfaced between the processor and the system bus during the design of the computer system. However, as the density of transistors on a process chip has increased, processors may be designed with one or more internal caches in order to decrease further memory access times. The internal cache used in these processors is generally small, an exemplary size being 8 k (8192 bytes) in size. In computer systems that utilize processors with one or more internal caches, an external cache is often added to the system to further improve memory access time. The external cache is generally much larger than the internal cache(s), and, when used in conjunction with the internal cache(s), provides a greater overall hit rate than the internal cache(s) would provide alone.

In systems that incorporate multiple levels of caches, when the processor requests data from memory, the internal or first level cache is first checked to see if a copy of the data resides there. If so, then a first level cache hit occurs, and the first level cache provides the appropriate data to the processor. If a first level cache miss occurs, then the second level cache is then checked. If a second level cache hit occurs, then the data is provided from the second level cache to the processor. If a second level cache miss occurs, then the data is retrieved from main memory. This process continues through higher levels of caches, if present. Write operations are similar, with mixing and matching of the operations discussed above being possible.

In many instances where multilevel cache hierarchies exist with multiple processors, a property referred to as multilevel inclusion is desired in the hierarchy. Multilevel inclusion provides that a second level (e.g., external) cache is guaranteed to have a copy of what is inside a first level (e.g., internal) cache. In this case, the second level cache holds a superset of the first level cache. Multilevel inclusion obviates the need for all levels of caches to snoop the system bus and thus enables the caches to perform more efficiently. Multilevel inclusion is most popular in multiprocessor systems, where the higher level caches can shield the lower level caches from cache coherency problems and thereby prevent unnecessary snoops that would otherwise occur in the lower level caches if multilevel inclusion were not implemented.

In a multiprocessor system where each processor utilizes a multilevel cache system with inclusion, there may be, for example, a Level 1 (L1) write-through cache associated with each processor and a larger, slower Level 2 (L2) write-back cache, which is still much faster than the main memory. The L2 and L1 caches utilize the MESI (pronounced "messy") protocol for managing the state of each cache line as follows: For each cache line, there is an M, E, S, or I state that indicates the current state of the cache line in the system. According to this well-known protocol, the Exclusive (E) bit indicates that the line only exists in this cache, the Shared (S) bit indicates that the line can be shared by multiple users at one time, the Invalid (I) bit indicates that the line is not available in the cache, and the Modified (M) bit indicates that the line has been changed or modified since it was first written to the cache. This management system improves system performance because unmodified lines need not be written back to the system's main memory.

The L1 cache does not require the Exclusive (E) bit in systems where it is the L2 cache's responsibility to manage line MESI state changes. Thus, the L1 cache may be said to implement the MSI protocol. In these systems, a line marked Exclusive (E) in L2, would be marked Shared (S) in L1. If another processor wants to share a copy of this line, the L2 cache would indicate via its snoop response that the line is Shared (S) and change the state of the L2 copy of the line to Shared (S). Because the L1 line state did not need to be changed, the L1 cache did not need to be involved in the line state change, thus improving performance.

In a multiprocessor environment, snoop latency may be fixed, which means that when a processor makes a storage request on the system bus, all other processors, or bus devices, must respond within a fixed period of time. In the event the storage request is a line read, other processors or devices which have a copy of the line are allowed to respond only with Shared (S) or Modified (M). A processor is not allowed to keep exclusive ownership of the line in this case. If the snoop response is Modified (M), the processor owning the current state of the line must provide the current copy to the requester, and change the state of its copy of the line to Shared (S) or Invalid (I), depending on the snoopy bus protocol. In systems where the L1 cache cannot be snooped, or the L1 cache snoop response cannot meet the fixed response time requirement of the snoopy bus, the L2 cache must mark a line as Modified (M) prior to any processor store to that line.

An alternative to snoopy protocols are directory based cache coherency protocols. In a directory based coherency scheme, the system typically contains a single directory having one entry for every address in main memory. Each directory entry identifies the ownership and data state information of each line of main memory. That is, the directory contents are tags. The data states tracked in a directory coherency system may be similar to the data states tracked in a snoopy system (e.g., MESI-based states or something similar).

OBJECTS OF THE INVENTION

An objective of the present invention is to exploit cache coherency information in a multiprocessor computing system in reaction to an address error.

One of the most serious types of errors in a computer system is an address error on a computer bus. On a typical computer bus, which contains a separate address bus (as well as a data bus and control lines), as address buses are designed in greater widths, the specter of address errors becomes more threatening. An address error is serious because a bus agent that reports the error must be assumed to have no idea what the true memory address target was. The result might be a memory controller providing the wrong data, or worse yet, writing the right data to the wrong memory location. When an address error occurs in a multiprocessor system, one or more processors may have inconsistent views of memory. In order to avoid the continued processing of corrupted data, most computers respond to an address error by generating a fatal error, which in turn causes an immediate failure of the operating system. This is disadvantageous because it does not permit graceful shutdown of applications.

Non-graceful shutdowns cause significant increases in recovery time for applications such as databases. In particular, non-graceful shutdowns may occur before the system has an opportunity to flush open buffers and close open files. As a result, storage files that reside on I/O (input/output) devices may be corrupt and inconsistent. Returning a computer file system to a known good state may require a great deal of time and effort. Typically, archival backups and/or update logs of the storage system are needed. Further, some data that has been entered since the last backup needs to be recreated, if that is even possible.

An advantage of the present invention is a higher likelihood of either avoiding the need for bringing the system down as a result of an address error or providing a window of opportunity in which to conduct a more orderly shutdown of critical operations, in response to an address error.

SUMMARY OF INVENTION

This invention is based upon the recognition that the property of inclusion, offered by an inclusive cache, coherency directory or other coherency filter provides unique opportunities for error recovery. In traditional bus-based MESI coherency systems, only the owner of a cache line knows that he owns it. Thus, if the owner dies or his connection to the system fails, the correct state of memory is totally unknown. The data structures used by inclusive systems to track inclusion (address tags for caches, and directory entries for directories) contain redundant information about the ownership of lines and, in some cases, up-to-date copies of modified data. The present invention is sometimes capable of providing enough data about the state of memory to allow applications to recover from address errors, such as parity errors. The information provided may be sufficient to allow a complete recovery, but more often, the information provided will allow the system to avoid corrupt data and run long enough to permit graceful shutdown of mission critical applications.

According to a method of the present invention, an address error is detected on a local channel, such as a local bus. The coherency states of one or more lines of cache memory associated with the local channel are then read, and actions are taken in response. Reading of coherency states ranges from a complete and active interrogation of all cache lines, to a selective and passive interrogation, such as in responding to snoop requests. If the data state consistency is unknown, such as when the MESI state is Modified (M) or Exclusive (E), then the corresponding data in main memory is poisoned. Poisoning may be accomplished by writing a detectable but unrecoverable error pattern in the main memory. Alternatively, the same effect may be accomplished by signaling a hard error on the system bus. If the data state consistency of an interrogated cache line is Shared (S) or Invalid (I), the line may be ignored or the line marked invalid. If the state of the cached line is valid and consistent, such as the "Modified uncached" (Mu) state in a MuMESI protocol, then the line may be written to main memory or provided to a snoop requester.

DETAILED DESCRIPTION OF PREFERRED EMBODIMENTS

Figure 1:
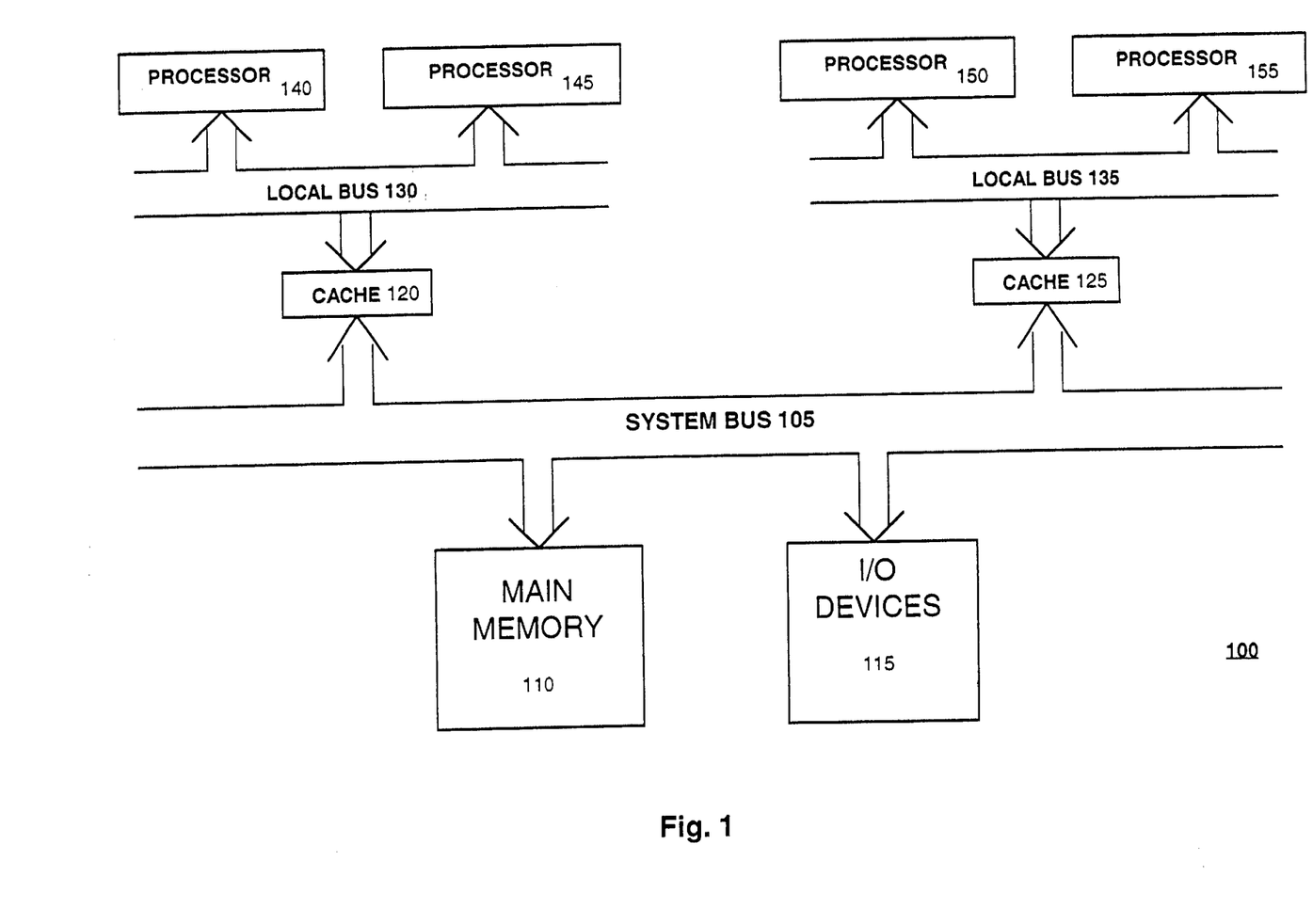
FIG. 1 is a block diagram of a multiprocessor computing system according to the present invention.

FIG. 1 is a block diagram of a multiprocessor computing system 100. A system bus 105 interconnects major system elements. Although the system bus 105 is illustrated as a bus, a bus is exemplary of any channel (e.g., ring) interconnecting major system elements. Attached to the system bus 105 is a main memory 110. One or more input/output (I/O) devices 115 may also be attached to the system bus 105. Exemplary I/O devices include disk drives, graphics devices and network interfaces. Also attached to the system bus 105 are caches 120 and 125. Although two caches are illustrated, any supportable number of caches is possible. Attached to the caches 120 and 125 are local buses 130 and 135, respectively. As with the system bus 105, the bus structure shown for local buses 130 and 135 is illustrative of any type of channel. Attached to the local bus 130 are processors 140 and 145. Attached to the local bus 135 are processors 150 and 155. Although two processors are illustrated on each local bus, the number of processors is arbitrary within system limits, including only a single processor.

Figure 2:
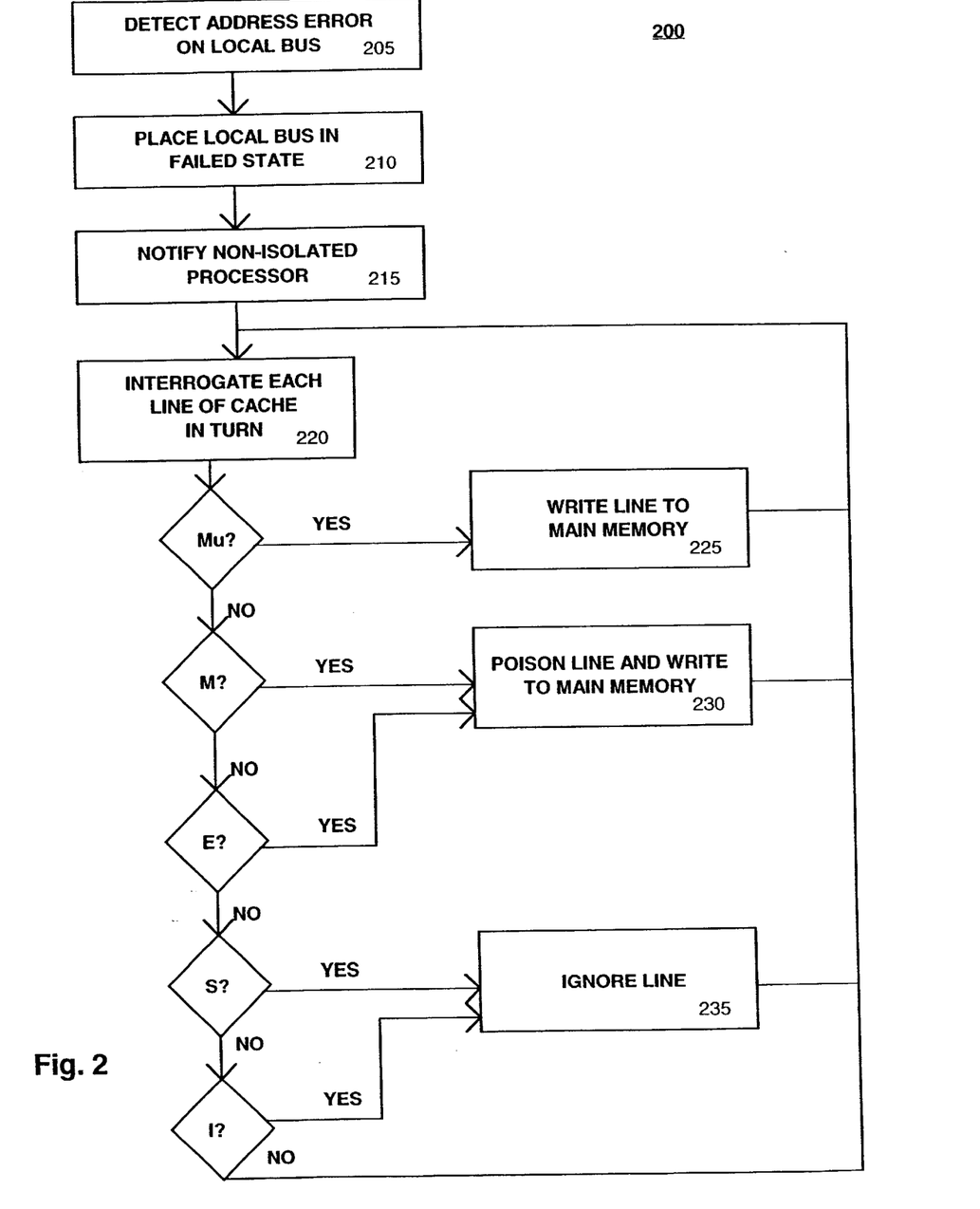
FIG. 2 is a flowchart of a first method according to the present invention.
Figure 3:
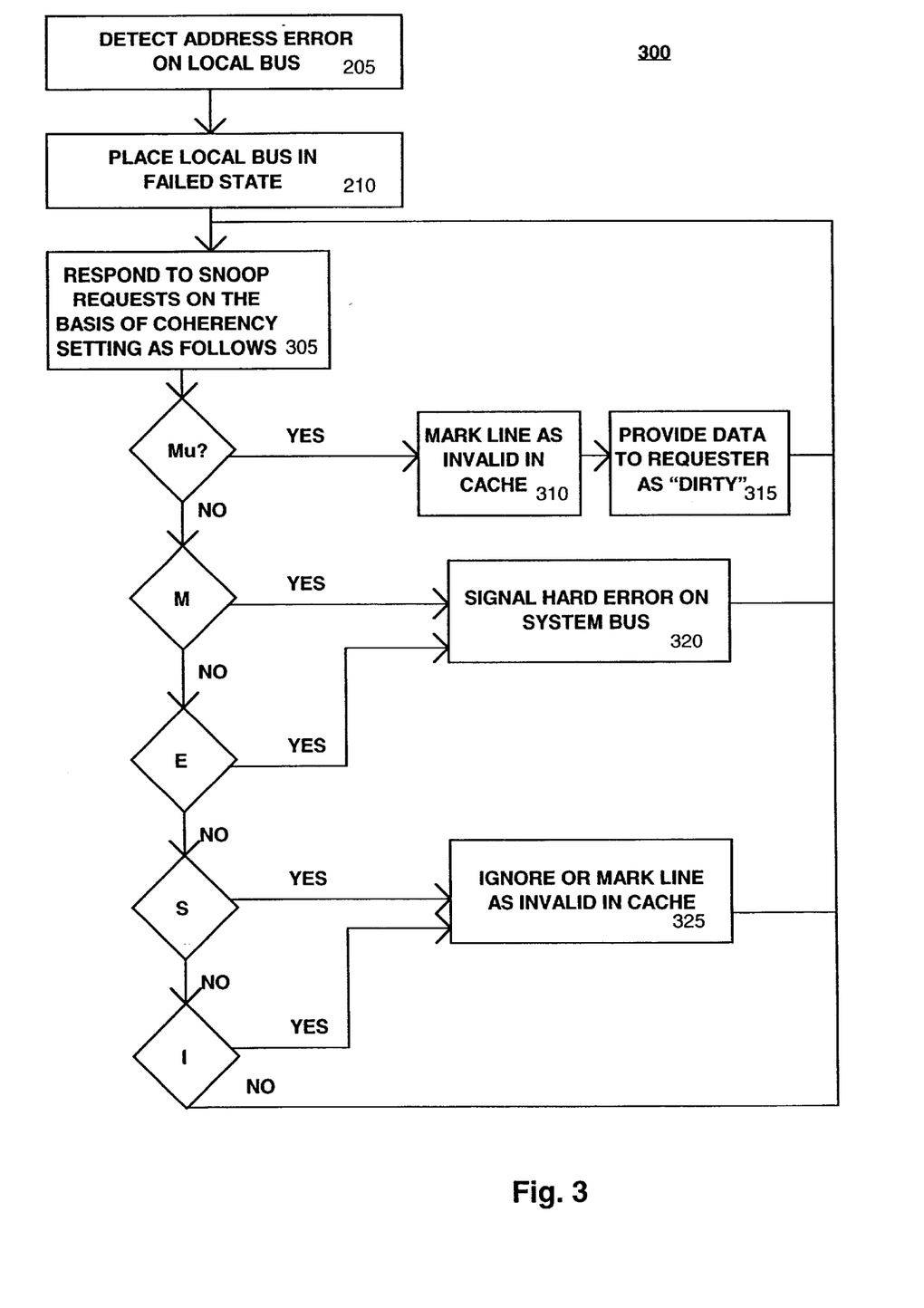
FIG. 3 is a flowchart of a second method according to the present invention.

FIGS. 2 and 3 are flowcharts of an address error recovery method for the multiprocessor computing system 100. The flowcharts of FIGS. 2 and 3 illustrate the method in reference to the following example: Assume that the processor 140 executes a read from a given memory address. The processor 145 sees this read on the local bus 130 and detects that the address is erroneous. The address is truly erroneous and cannot be remedied by retransmission or other protocol. Thus, the cache 120 may be inconsistent.

According to the method 200 illustrated in FIG. 2, a detecting step 205 is first taken to determine that the address seen on the local bus 130 is erroneous. Typically this detecting step 205 comprises a parity check over the address field. After an error is detected, the local bus 130 is placed in a failed state, according to the placing step 210, so that the local bus 130 is cut off from the rest of the system 100. The placing step 210 has the effect of quiescing the processors 140 and 145 and assures that any corrupted data that may exist in the processor 140, the processor 145 or the local bus 130 cannot be transferred to the main memory 110 or another part of the system 100. Next, a notifying step 215 is performed to notify another processor of the error. The notified processor may be a another processor, such as the processors 150 or 155, or a separate processor, such as a master processor or a maintenance processor (not shown). It is necessary that the notified processor not be isolated from the cache 120 or the main memory 110, so that the notified processor can execute a recovery routine. Any method of notification can be utilized to reach this non-isolated processor. An exemplary method of notification is signaling an interrupt line, preferably a high priority interrupt line.

In response to the notifying step 215, the non-isolated processor performs an interrogating step 220 on each line in the cache 120. Based upon a coherency state of a line, an appropriate action is taken so as to minimize the impact of the address error. The interrogated coherency states may be stored in the cache 120 in the case of a snoopy system or in a directory (not illustrated) in a directory based coherency system. In a preferred embodiment, the possible coherency states are based upon the MSI, MESI, MOESI, MuMESI or similar protocols, which are collectively referred to as MESI-based schemes. If the MESI state of a given line is Modified uncached (Mu)—if this state is implemented—then a main memory writing step 225 is taken, by which the given cache line is written to the main memory 110. The Mu-MESI protocol augments the basic MESI protocol by utilizing an additional "Modified uncached" (Mu) state. This state basically signifies that a cache line is valid and consistent and is described in greater detail in pending U.S. patent application Ser. No. 09/290,430, entitled "Optimization of MESI/MSI Protocol to Improve L3 Cache Performance" (attorney docket no. HP 10981260-1), which is hereby incorporated by reference. The MOESI protocol is another variation of the MESI protocol and is well known to those skilled in the art.

If the MESI state of the given line is Modified (M), representing that the consistency of this data is unknown, then a poisoning step 230 is performed. The objective of the poisoning step 230 is to ensure that corrupt data will not be used by the system 100 in subsequent computations. According to the poisoning step 230, a detectable but uncorrectable error pattern is written onto the data field corresponding to this line in the main memory 110. Thus, poisoned data cannot be utilized by other processors, and other processors may be able to continue running without a critical need for that piece of poisoned data long enough to be able to shut down gracefully. Such is likely the case when the poisoned data is user data for an application program. In a preferred embodiment, the data field comprises redundant error correction bits, such as CRC (cyclic redundancy check) check bits or one or more parity bits, in which case a known unique error pattern, preferably having a unique and reserved syndrome, can be used to poison the data such that the probability of an actual error in the data field causing the same pattern is minimized.

If the MESI state of the given line is Exclusive (E) representing that the consistency of this data is unknown, provided that this state is implemented, then the poisoning step 230 is likewise performed. If the MESI state of the given line is Shared (S), meaning that a valid copy of the line is already in memory, or Invalid (I) meaning that the line is unavailable, then an ignoring step 235 is taken. That is, the recovery routine takes no action in this case.

Another address error recovery method 300 for the system 100 is illustrated in FIG. 3. In the method 300, the detecting step 205 and the placing step 210 are the same as the method 200. However, after detecting an address error and placing the local bus 130 in a failed state, the method 300 executes a different recovery routine. In particular, no affirmative steps are taken except in response to snoop requests. That is, the cache 120 is interrogated only when requested and only to the extent requested. More specifically, the cache 120 (specifically, a cache controller therein) continues to receive snoop requests and performs a snoop responding step 305 as follows: If the snoop request pertains to a line in the cache 120 and the MESI state of that line is "Modified uncached" (Mu), then the recovery routine performs an invalid marking step 310 and a dirty data delivery step 315. According to the invalid marking step 310, the line is marked as Invalid (I) in the cache 120. According to the dirty data delivery step 315, the line of data is provided to the requester, but the recovery routine also informs the requester that the data is "dirty," meaning that the value held in the cache 120 is different from the main memory 105, (i.e., modified). For example, when Intel Pentium (™) processors are utilized, the HITM signal line may be asserted to denote the special nature of the data. If the snoop request pertains to a line in the cache 120 having an unknown consistency, such as a Modified (M) or Exclusive (E) coherency state, then a signaling step 320 is performed, by which a hard error is signaled on the system bus 105. If the snoop request pertains to a line having an Shared (S) or Invalid (I) MESI state, then an ignoring or invalid marking step 325 is taken. In this case, the snoop request may be ignored or the corresponding line in the cache 120 may be marked as Invalid (I). The method 300 is applicable only when the snoopy coherency protocol is used, not when a directory based coherency protocol is used.

Figure 4:
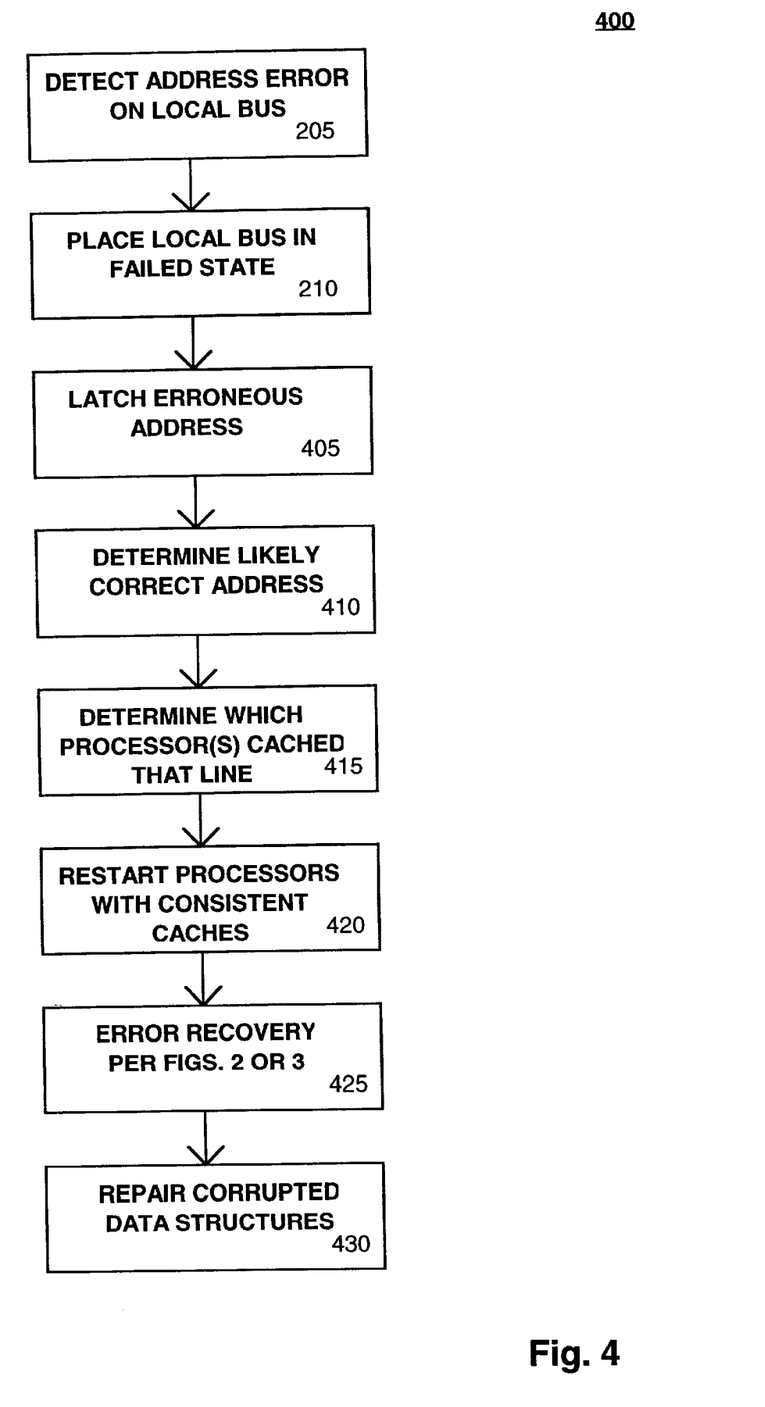
FIG. 4 is a flowchart of a third method according to the present invention.

FIG. 4 is a flowchart of another address error recovery method 400 according to the present invention. In FIG. 4, the detecting step 205 and the placing step 210 are the same as in FIGS. 2 or 3. According to the method 400 of FIG. 4, a latching step 405 is taken to latch the address that caused the address error on the local bus 120. Based upon this erroneous address, the method 400 undertakes a correct address determination step 410. The correct address determination step 410 may take various forms depending upon where the address was latched. If the cache 120 latched the address and did not detect an error in the address, then the address latched by the cache 120 is likely to be the correct address. If the address is latched after the error is detected, then there is still a high statistical likelihood that the correct address is very similar to the latched erroneous address. In fact, the most likely error is a single bit error. If, for example, the address field is 64 bits in width, then there are 64 possible addresses that are a Hamming distance (i.e., a measure of the number of different bits) of one from the latched address. Thus, the correct address is likely to be found in the cache 120 by first searching the cache 120 for a line whose address is a Hamming distance of zero or one from the latched address, and if not found, searching the cache 120 for lines whose address is a Hamming distance of two from the latched address. If necessary, the search can be continued at larger Hamming distance until a cache line is found; however, as the Hamming distance increases, the chance of finding the true correct address decreases and the chances of false positives increase.

Assuming that the correct address is determined, the method 400 proceeds to perform a processor determination step 415. In one form, the processor determination step 415 may examine the tag of the line found in the cache 120, if the tag indicates the owner of the line. In another form, the processor determination step 415 checks the lower level caches of each processor on the local bus 130 to determine which processor(s) cached the line having the address found to be the correct address. Because of inclusion, at least one such processor should be determined.

Next, according to a restarting step 420, those processors on the local bus 130 that do not contain the line in its lower level cache are restarted. Then, an error recovery step 425 is taken, which entails either the steps 220–235 of FIG. 2 or the steps 305–325 of FIG. 3, for example. In this way, some of the processors attached to the local bus 130 potentially are able to continue to operate until a graceful shutdown can be achieved.

The final step of the recovery method 400 is a repairing step 430. According to the repairing step 430, an attempt is made to repair corrupted data that had to be poisoned. Whereas the steps 405–425 are generally directed at poisoning data that is likely to be corrupt, the repairing step 430 tries to fix the problem. For example, if the address of a dispatch-queue-lock as seen being poisoned, the data structure that the dispatch-queue-lock protects can be scanned to determine if it is consistent and then the lock can be repaired. It is believed that fixing a few data structures like this will greatly increase the longevity of the system. Other poison recovery routines, similar to what was just described for the dispatch-queue-lock, may also be written for other critical operating system or application structures, as part of the repairing step 430.

The repairing step 430 can be understood metaphorically as follows: It is hoped that killing sick data will prolong the life of the entire system until the system can die with dignity. This is likely if the sick or corrupt data is not essential to system operation. However, even when corrupt data is essential to the system, it may be possible to repair that data so that the system can continue operating. That is, it may be possible in such cases to cure the disease in addition to diagnosing it.

Figure 5:
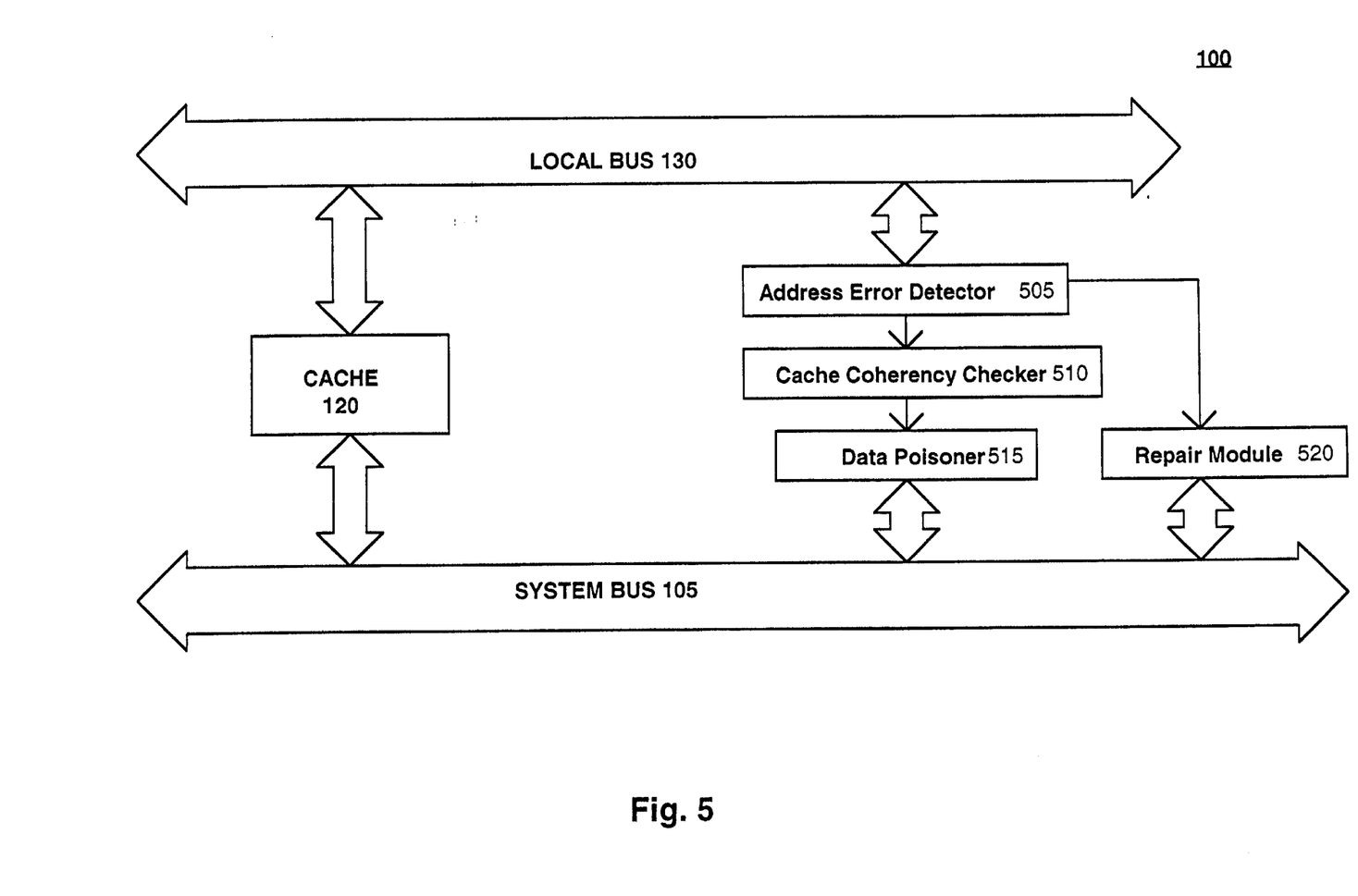
FIG. 5 is a block diagram of modules according to the present invention.

FIG. 5 partially illustrates the multiprocessor computing system 100 from the perspective of the modules of the present invention. An address error detector module 505 is connected to a first channel, such as the local bus 130 and performs the detecting step 205 and possibly the placing step 210. A cache coherency checks module 510 is connected to the address error detector module 505 and either the interrogating step 220 or the snoop responding step 305 or a combination of both. A data poisoner module 515, connected to the cache coherency checks module 510 and a second channel, such as the system bus 105, implements the poisoning step 225 and/or the error signaling step 320. A repair module 520 implement some or all steps of the method 400. The modules shown in FIG. 5 may be software, hardware, firmware, or some combination.

The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method comprising:
   detecting an address error on a local channel of a computer system;
   reading a coherency state of a line in a cache memory associated with the local channel;
   executing a recovery routine; and
   poisoning corresponding data in a main memory, if the coherency state of the line is a modified or an exclusive state,
   wherein the poisoning step comprises writing a data pattern having a detectable but uncorrectable error.

2. The method of claim 1, wherein the poisoning step comprises signaling a hard error on a system bus.

3. The method of claim 1 wherein the recovery routine comprises:
   ignoring the line in the cache memory if the coherency state of the line is a shared or an invalid state.

4. The method of claim 1 wherein the coherency state is a state according to a MESI-based protocol.

5. The method of claim 1 wherein the error is a parity error.

6. The method of claim 1 wherein the local channel is a local bus.

7. The method of claim 1 further comprising:
   placing the local channel in a failed state, in response to the detecting step.

8. The method of claim 1 further comprising:
   notifying a non-isolated processor of the error; and
   executing the error recovery routine on the non-isolated processor, in response to the notifying step.

9. The method of claim 1 wherein the recovery routine comprises:
   repairing a data structure.

10. The method of claim 1 wherein the reading step comprises reading a coherency directory.

11. The method of claim 1 further comprising:
    receiving a snoop request; and
    wherein the reading step is performed in response to receipt of the snoop request and the reading step comprises reading coherency bits within the line of the cache memory.

12. The method of claim 1 further comprising:
    latching the erroneous address;
    determining a likely correct version of the erroneous address;
    determining whether a processor on the local channel has cached the likely correct version of the erroneous address; and
    operating the processor, if the processor has not cached the likely correct version of the erroneous address.

13. The method of claim 12 wherein the step of determining at least one likely correct version comprises:
    searching a cache for a line based on a Hamming distance from the erroneous address.

14. The method of claim 12 further comprising:
    quiescing all processors on the local channel; and
    wherein the operating step comprising restarting the processor.

15. A method comprising:
    detecting an address error on a local channel of a computer system;
    reading a coherency state of a line in a cache memory associated with a local channel;
    executing a recovery routine; and
    writing the line to the main memory if the coherency state of the line is a modified uncached state.

16. The method comprising:
    detecting an address error on a local channel of a computer system;
    reading a coherency state of a line in a cache memory associated with the local channel;
    executing a recovery routine;
    receiving a snoop request, wherein the reading step is performed in response to receipt of the snoop request and the reading step comprises reading coherency bits within the line of the cache memory; and
    signaling a dirty line, providing data associated with the line of the cache to the snoop request, and marking the line of the cache as invalid, if the coherency state indicates that the line is in a modified uncached state.

17. A computer system comprising:
    a first channel;
    a second channel;
    a cache connected between the first channel and the second channel; and
    an address error detector connected to the first channel;
    a cache checker connected to the address error detector, wherein the cache checker returns a coherency state for a line in the cache; and
    a data poisoner, connected to the cache checker and the second channel, wherein the data poisoner selectively writes a predetermined data pattern on the second channel on the basis of the coherency state of the line in the cache.

18. The computer system of claim 17 further comprising:
    a data repair module connected to the address error detector and the second channel.

* * * * *